UNITED STATES PATENT OFFICE.

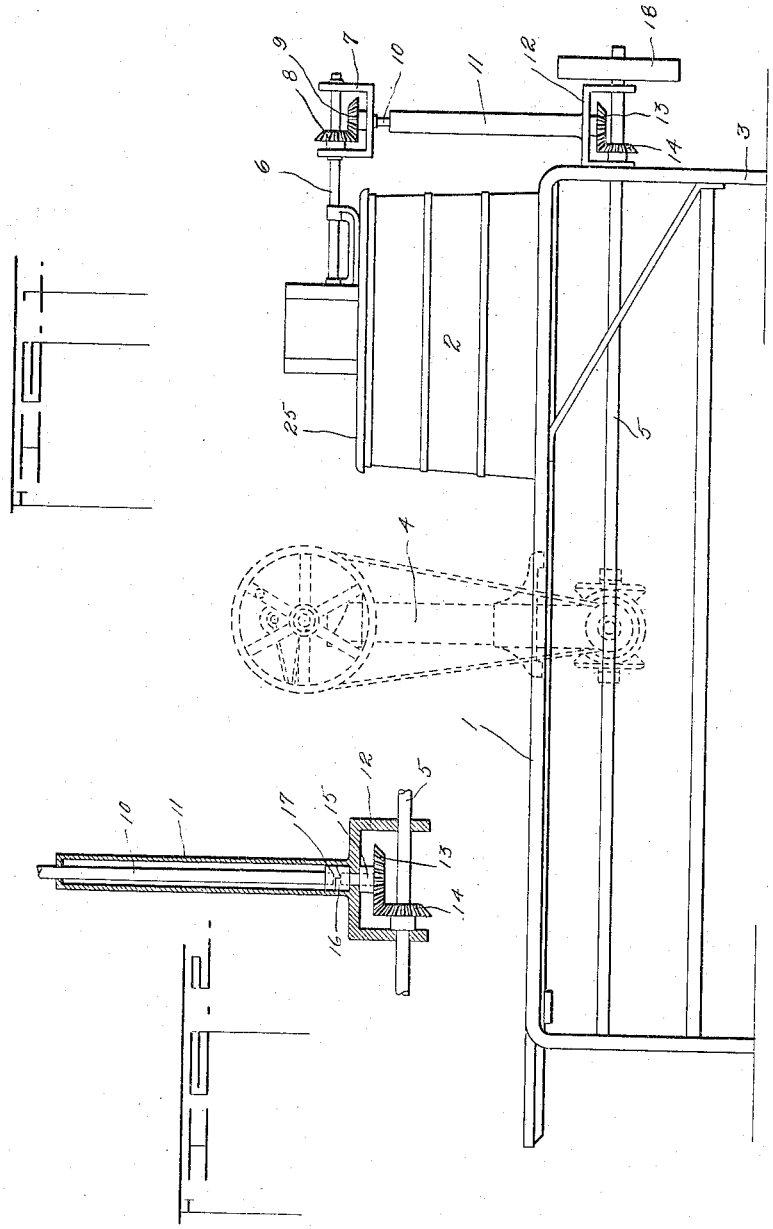

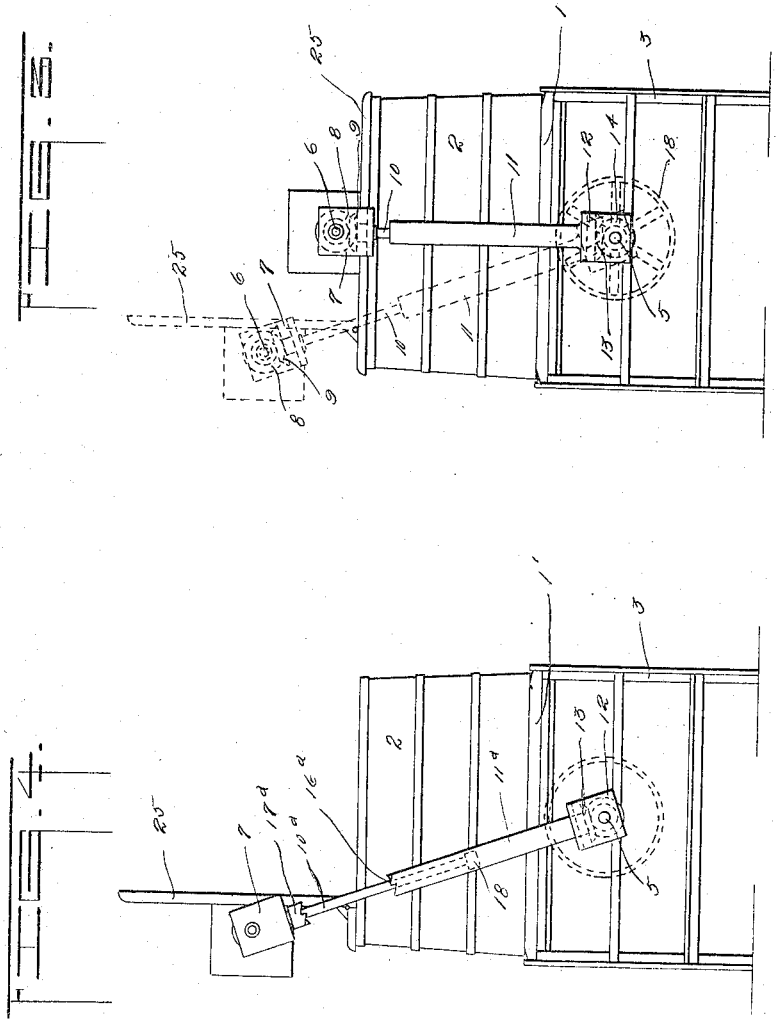

ALPHEUS W. ALTORFER, OF ROANOKE, ILLINOIS, ASSIGNOR TO ALTORFER BROS. CO., OF ROANOKE, ILLINOIS, A COPARTNERSHIP CONSISTING OF HENRY ALTORFER, SILAS H. ALTORFER, AND ALPHEUS W. ALTORFER.

DRIVING MECHANISM.

1,158,098.

Specification of Letters Patent.

Patented Oct. 26, 1915.

Application filed August 29, 1913. Serial No. 787,304.

*To all whom it may concern:*

Be it known that I, ALPHEUS W. ALTORFER, a citizen of the United States, residing at Roanoke, in the county of Woodford and State of Illinois, have invented certain new and useful Improvements in Driving Mechanism, of which the following is a specification.

This invention has reference to a driving mechanism.

One of the objects of the present invention is to improve the driving mechanism of power washing machines and like structures.

The invention consists essentially of a driving shaft which may be adapted to receive its power from any suitable motor or other source; gearing associated with the washer elements and carried by or attached to the movable lid or cover of the washing machine, and connections between said driving shaft and said gearing, said connections including clutch parts adapted to be disconnected when the lid or cover of the machine is raised, whereby the washer elements are inoperative when the lid or cover of the machine is raised, while at the same time the driving shaft is in operation, and which said washer elements may be placed in operation by the lowering of the lid or cover of the machine, such movement setting said clutch parts.

In the drawings:—Figure 1 is a side elevation of a preferred form of washing machine, embodying my improvements; Fig. 2 is a sectional detail showing a part of the driving connections between the driving shafts and the gearing for operating the washer elements; Fig. 3 is an end view, looking at the right hand end of Fig. 1, showing in dotted lines the lid or cover of the washing machine raised, in which position the clutch has been disconnected, breaking the power between the driving shaft and washer elements, and Fig. 4 is a view, similar to Fig. 3, except that a modified form of driving connection, including a clutch is shown.

Like characters of reference denote corresponding parts throughout the figures.

My improved driving mechanism for washing machines is applicable to all forms of machines where it is desired to operate the washer elements by power, such as an electric motor, water motor, gasolene engine and the like, including not only that type of machine shown in the drawings where a platform machine is illustrated, but also to the "stave leg" type and all other and various forms of washing machines.

In illustrating the preferred embodiment of the invention, I have shown it applied to that type of machine, including the platform 1, which may be of any suitable length and arranged to support the washer tub 2, and one or more rinse tubs or other receptacles, not shown. The platform 1 has supporting legs 3, at its corners. The detail structure of the platform, its legs, braces, etc., is not material, as no claim is made to such details.

In Patents Nos. 1,047,118 and 1,047,119 issued to me on the tenth day of December, 1912, there is illustrated a type of machine and supporting platform, somewhat similar to that disclosed herein, including a movable or slidable wringer support, illustrated herein in dotted lines in Fig. 1, and referred to generally as 4; the wringer mechanism adapted to receive its power from the driving shaft 5. In my application filed on the 12th day of September 1912, for improvements in combined power washing and wringing mechanism, bearing Serial No. 719,935, I also show a machine and supporting platform, including the movable wringer support.

The washing machine 2 may be provided with any desired or preferred form of washer elements, not shown, the same adapted to be actuated by any suitable operating means, preferably supported by or attached to the lid or cover 25 of the washer 2, including the shaft 6. The lid or cover 25 is suitably hinged to adapt it to be raised or lowered, and when raised will permit access to the interior of the washer and will raise the washer elements into inoperative position.

On the end of the shaft 6 is supported, in a suitable manner, a bracket or housing 7, said bracket or housing confining a pair of meshing bevel gear wheels 8 and 9, the gear wheel 8 carried by the shaft 6 and the gear wheel 9 carried by a shaft 10. The shaft 10 has a bearing in the bracket or housing 7 and is also carried and has longitudinal movement in an elongated sleeve or bearing 11, said sleeve or bearing 11 forming a part of or secured in any suitable manner to a bracket or housing 12 carried on the driving shaft 5. The bracket or housing 12 confines a pair of meshing bevel gear wheels 13 and 14. The gear wheel 13 carried by a short shaft 15 having a bearing in said bracket or housing 12 and extending up into the sleeve or bearing 11, and the gear 14 being carried on a driving shaft 5.

On the upper end of the shaft 15 is carried a clutch part 16 and on the lower end of the shaft 10 is arranged a clutch part 17 adapted to have a clutch engaging relation with the clutch part 16 to insure the transmission of power from the shaft 5 to the shaft 6, when desired.

The bracket or housing 12 has a swingable relation with respect to the shaft 5, as the sleeve 11 and the shaft 10 must swing in an arc of a circle, whose center is the axis of the shaft 5, when the lid or cover 25 of the washer is raised. The raising of the lid or cover 25 will move the shaft 10 longitudinally in the sleeve 11, and such movement will disconnect or separate the clutch part 17 from the clutch part 16, placing the washer elements in an inoperative position. When the lid or cover 25 is lowered and closed, the shaft 10 and sleeve 11 will be swung back into their normal positions and the clutch part 17 on the lower end of the shaft 10 will move into clutch engaging relation with the clutch part 16, when, if the shaft 5 is being operated power will be transmitted through the gears 13 and 14, the shafts 15 and 10, the gears 8 and 9 and the shaft 6, to the washer elements.

On the shaft 5 is a pulley 18, or equivalent member for receiving power from any suitable motor or other driving means.

In Figs. 1, 2 and 3, the sleeve or bearing 11 does not rotate, but in Fig. 4 is shown a construction where a similar sleeve or bearing 11ª does rotate. In this construction the gear wheel 13 is connected directly to the lower end of the sleeve 11ª, which has a bearing in the bracket or housing 12, and the upper end of said sleeve 11ª is provided with a clutch part 16ª. The shaft 10ª, being somewhat similar to the shaft 10 is carried and movable in the sleeve 11ª, in manner similar to the shaft 10 in the sleeve 11, and on said shaft 10ª, adjacent the bracket or housing 7, is carried a clutch part 17ª. When the lid or cover 25 is raised, the shaft 10ª, the sleeve 11ª and bracket 12 will be swung on the shaft 5, while at the same time the shaft 10ª will move longitudinally in the sleeve 11ª, disconnecting or separating clutch part 17ª from the clutch part 16ª. The shaft 10ª on its lower end may be provided with a head 18 fitting reasonably snug in the sleeve 11ª so as to center the shaft in the sleeve and guide the shaft in its movement up and down in said sleeve.

With the use of the present construction all gearing may be housed and in constant meshing relation, and all clutch throwing levers and similar parts are done away with. The raising of the lid or cover of the machine, accomplishes the double result of disconnecting the clutch part or power between the driving means and the washer elements, and of moving the washer elements into inoperative position to enable a person to remove clothes or other materials from said washer and for putting others therein.

Attention is called to the patent issued to me on July 1, 1913, No. 1,066,070 as disclosing a type of machine to which the present improvements might easily be applied.

What I claim is:—

1. In a driving mechanism, a machine, a driving shaft, an operating means for said machine, said operating means being so supported that it may be raised from an operative position to an inoperative position, a driving mechanism between said driving shaft and said operating means, including clutch parts; the connection and disconnection of said clutch parts being controlled by the raising and lowering of said operating means.

2. In a driving mechanism, a machine support, a machine mounted on said support, a driving shaft, an operating means for said machine movably mounted thereon, and including a shaft and a driving member, a driving mechanism between said driving shaft and said driving member, including clutch parts; the connection and disconnection of said clutch parts being controlled by moving said operating means.

3. In a driving mechanism, a machine having a hinged member, a driving part mounted on said hinged member, and movable therewith, a driving shaft, a driving mechanism between said shaft and said driving part, including clutch parts, said clutch parts being in operative relation when said hinged member is in one position, and adapted to be disconnected when said hinged member is moved into another position.

4. In a driving mechanism, a machine, operating means mounted on said machine, a driving shaft, driving mechanism between said shaft and said operating means, including clutch parts, one of said clutch parts and the operating means for said machine being adapted to be moved together, said clutch parts being normally in operative relation, the movement of said operating means serving to break the operative relation between the clutch parts.

5. In a driving mechanism, a machine having a hinged member, a driving part mounted on said hinged member, and movable therewith, a driving shaft, clutch controlled gearing interposed between said shaft and said driving part for imparting movement from said shaft to said driving part, said clutch being controlled by the movement of said hinged member, and said gearing and clutch being oscillated by the movement of said hinged member.

6. In a driving mechanism, a machine, an operating means for the machine, said operating means being movable to operative and inoperative positions, a driving shaft, a bracket on said driving shaft, gearing operated by said shaft and confined within said bracket which is swingable on said shaft, driving connections between said gearing and said operating means, including clutch parts, one of said clutch parts and said operating means being so associated that they may be moved to inoperative positions in unison.

7. In a driving mechanism, a machine and supporting means therefor, said machine having a hinged member which is adapted to be raised and lowered, an operating shaft journaled on said hinged member, a wheel carried on said shaft, a driving shaft journaled on said machine support, means on said driving shaft adapted to receive power from a suitable source, a wheel on said driving shaft, a driving mechanism operatively connected with the wheels on said driving and operating shafts, and clutch parts suitably located between said driving shaft and said operating shaft, for controlling the operation of the latter.

8. In a driving mechanism, a machine and supporting means therefor, said machine having a hinged member which is adapted to be raised and lowered, an operating shaft journaled on said hinged member, a gear wheel carried on said shaft, a driving shaft journaled on said machine support, a gear wheel on said driving shaft, a sleeve disposed between said driving and operating shafts, a shaft carried in said sleeve, said shaft adapted to be driven from the gear wheel on the driving shaft and transmit motion to the gear wheel on the operating shaft, and clutch parts for controlling the operation of the shaft in the sleeve, said clutch parts being controlled by the raising and lowering of said hinged member.

9. In a driving mechanism, a machine and supporting means therefor, said machine having a hinged member which is adapted to be raised and lowered, an operating shaft journaled on said hinged member, a bracket swingably carried on said shaft, a driving shaft journaled on said machine support, a bracket swingably carried on said driving shaft, a sleeve extending up from said last mentioned bracket in the direction of the bracket on the operating shaft, a shaft journaled in the bracket on the operating shaft and movable longitudinally in said sleeve, gearing for operating said shaft in the sleeve from said driving shaft, said gearing being confined by said bracket on the driving shaft, gearing for operating the operating shaft from the shaft in the sleeve, said gearing being confined by said bracket on the operating shaft, and clutch parts between the gearing for operating the shaft in the sleeve and the gearing for operating the operating shaft, said clutch parts adapted to be controlled by the movement of said hinged member.

10. In a driving mechanism, a machine and supporting means therefor, said machine having a hinged member which is adapted to be raised and lowered, an operating shaft journaled on said hinged member, a driving shaft journaled on said machine support, a sleeve having a swingable relation with respect to said driving shaft and extending in the direction of said operating shaft, a countershaft having a swingable relation with respect to said operating shaft and extending in the direction of said driving shaft and having a bearing and slidable relation in said sleeve, gearing for operating said counter-shaft from said driving shaft, gearing for operating the operating shaft from said counter shaft, clutch parts arranged between the gearing aforesaid for controlling the transmission of power from the driving shaft to the operating shaft, said clutch parts controlled by the raising and lowering of said hinged members, and said counter shaft and sleeve being movable to adapt the same to the swinging movement of the hinged member.

In testimony whereof I affix my signature, in presence of two witnesses.

ALPHEUS W. ALTORFER.

Witnesses:
S. H. ALTORFER,
G. B. GEIGER.